US012726785B2

(12) United States Patent
Enomoto et al.

(10) Patent No.: US 12,726,785 B2
(45) Date of Patent: Sep. 1, 2026

(54) INFORMATION PROCESSING METHOD, INFORMATION PROCESSING DEVICE, ACOUSTIC REPRODUCTION SYSTEM, AND RECORDING MEDIUM

(71) Applicant: Panasonic Intellectual Property Corporation of America, Torrance, CA (US)

(72) Inventors: Seigo Enomoto, Kyoto (JP); Hikaru Usami, Osaka (JP); Kota Nakahashi, Osaka (JP); Hiroyuki Ehara, Kanagawa (JP); Mariko Yamada, Hyogo (JP); Ko Mizuno, Osaka (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 134 days.

(21) Appl. No.: 18/904,376

(22) Filed: Oct. 2, 2024

(65) Prior Publication Data

US 2025/0031005 A1 Jan. 23, 2025

Related U.S. Application Data

(63) Continuation of application No. PCT/JP2023/014066, filed on Apr. 5, 2023.

(Continued)

(30) Foreign Application Priority Data

Feb. 15, 2023 (JP) ................................ 2023-021510

(51) Int. Cl.
*H04S 7/00* (2006.01)

(52) U.S. Cl.
CPC .......... *H04S 7/304* (2013.01); *H04S 2420/01* (2013.01)

(58) Field of Classification Search
CPC ........ H04S 7/00; H04S 7/304; H04S 2420/01; H04S 7/306; H04S 2400/11; H04S 7/301; H04S 7/303; H04S 2400/07
See application file for complete search history.

(56) References Cited

U.S. PATENT DOCUMENTS

| | | | | |
|---|---|---|---|---|
| 2012/0206452 A1* | 8/2012 | Geisner | ................... | G06F 3/013 345/419 |
| 2019/0289418 A1* | 9/2019 | Jang | ........................ | H04S 7/304 |
| 2020/0221247 A1* | 7/2020 | Latypov | .................. | G06F 3/167 |

FOREIGN PATENT DOCUMENTS

| | | | | |
|---|---|---|---|---|
| JP | 2020018620 | * 8/2018 | ............. | A63F 13/57 |
| JP | 2020-18620 | 2/2020 | | |

OTHER PUBLICATIONS

International Search Report (ISR) issued on Jun. 20, 2023 in International (PCT) Application No. PCT/JP2023/014066.

(Continued)

*Primary Examiner* — Yosef K Laekemariam
(74) *Attorney, Agent, or Firm* — Wenderoth, Lind & Ponack, L.L.P.

(57) ABSTRACT

An information processing method includes: obtaining a position of a user within the three-dimensional sound field; determining a virtual boundary that includes two or more lattice points surrounding the user, based on the position of the user which has been obtained, the two or more lattice points being among a plurality of lattice points set at predetermined intervals within the three-dimensional sound reading field; the propagation characteristics of the sound from the sound source to the two or more lattice points included in the virtual boundary determined; calculating transfer functions of the sound from the two or more lattice (Continued)

points included in the virtual boundary determined to the position of the user; and generating the output sound signal by processing the sound information using the propagation characteristics read and the transfer functions calculated.

8 Claims, 7 Drawing Sheets

Related U.S. Application Data

(60) Provisional application No. 63/330,841, filed on Apr. 14, 2022.

(56) References Cited

OTHER PUBLICATIONS

S. Takane, et al., "Advise: a New Method for High Definition Virtual Acoustic Display", Proceedings of the 2002 International Conference on Auditory Display, Kyoto, Japan, Jul. 2-5, 2002.

Seigo Enomoto et al., "Binaural reproduction of 3D sound using C80 fullerene-shaped microphone array and simulated HRTFs" Nihon Onkyō Gakkai Kōen Ronbunshū [Reports of the Meeting of the Acoustical Society of Japan], pp. 919-920, Mar. 2012 with Partial English Translation and cited in the specification.

* cited by examiner

INFORMATION PROCESSING METHOD, INFORMATION PROCESSING DEVICE, ACOUSTIC REPRODUCTION SYSTEM, AND RECORDING MEDIUM

CROSS REFERENCE TO RELATED APPLICATIONS

This is a continuation application of PCT International Application No. PCT/JP2023/014066 filed on Apr. 5, 2023, designating the United States of America, which is based on and claims priority of Japanese Patent Application No. 2023-021510 filed on Feb. 15, 2023 and U.S. Provisional Patent Application No. 63/330,841 filed on Apr. 14, 2022. The entire disclosures of the above-identified applications, including the specifications, drawings and claims are incorporated herein by reference in their entirety.

FIELD

The present disclosure relates to an information processing method, an information processing device, an acoustic reproduction system including the information processing device, and a recording medium.

BACKGROUND

Techniques relating to acoustic reproduction for causing a user to perceive three-dimensional sounds within a virtual three-dimensional space have been conventionally known (for example, see Patent Literature (PTL) 1). In order to cause a user to perceive sounds as if the sounds are arriving from a sound source object to the user within such a three-dimensional space, it is necessary to perform processing of generating output sound information from the original sound information. Since an enormous amount of processing is necessary to reproduce three-dimensional sounds in response to movements made by a user within a virtual space, technological development to reduce an amount of processing has been particularly encouraged (for example, Non Patent Literatures (NPLs) 1 and 2). Development in computer graphics (CG), in particular, has enabled comparatively easy creation of a visually-complicated virtual environment, and this places importance on techniques for implementing auditory information that corresponds to such a visually-complicated virtual environment. When processing of generating output sound information from sound information is performed in advance, a large storage area is additionally necessary to store processing results obtained from calculations performed in advance. Moreover, a wide communication band is likely to be necessary when transmitting such a large amount of data on the processing results.

CITATION LIST

Patent Literature

PTL 1: Japanese Unexamined Patent Application Publication No. 2020-18620

Non Patent Literature

NPL 1: S. Takane, et al., "ADVISE: A NEW METHOD FOR HIGH DEFINITION VIRTUAL ACOUSTIC DISPLAY", Proceedings of the 2002 International Conference on Auditory Display.

NPL 2: "$C_{80}$ Furāren-gata maikurohonarei to tōbudentatsukansu wo mochiita bainōraru saisei [Binaural Reproduction Using $C_{80}$ Fullerene-type Microphone Array and Head-elated Transfer Function], Proceedings of the 2012 Spring Meeting of the Acoustical Society of Japan.

SUMMARY

Technical Problem

In order to implement a more real-world sound environment, a large amount of processing is necessary due to the following reasons: an increase in the number of objects that emit sounds within a virtual three-dimensional space, an increase in acoustic effect such as reflected sounds, diffracted sounds, reverberations, and the need for appropriately changing these acoustic effects in response to movements made by a user. Meanwhile, devices that a user use to experience a virtual space tend to be devices having a small amount of processing, such as a smartphone and a head-mount display alone. In order to generate an appropriate output sound signal (stated differently, an output sound signal capable of implementing the above-described more real-world sound environment) even by such a device having a small amount of processing, it is necessary to further reduce an amount of processing.

Solution to Problem

An information processing method according to one aspect of the present disclosure is an information processing method of generating, by processing sound information, an output sound signal for causing a user to perceive a sound as arriving from a sound source within a three-dimensional sound field that is virtual. The information processing method is executed by a computer. The information processing method includes: obtaining a position of the user within the three-dimensional sound field; determining a virtual boundary that includes two or more lattice points surrounding the user, based on the position of the user which has been obtained, the two or more lattice points being among a plurality of lattice points set at predetermined intervals within the three-dimensional sound field; reading, from a database that stores propagation characteristics of the sound from the sound source to the plurality of lattice points, the propagation characteristics of the sound from the sound source to the two or more lattice points included in the virtual boundary determined; calculating transfer functions of the sound from the two or more lattice points included in the virtual boundary determined to the position of the user; and generating the output sound signal by processing using the sound information the propagation characteristics read and the transfer functions calculated.

In addition, an information processing device according to one aspect of the present disclosure is an information processing device that generates, by processing sound information, an output sound signal for causing a user to perceive a sound as arriving from a sound source within a three-dimensional sound field that is virtual. The information processing device includes: an obtainer that obtains a position of the user within the three-dimensional sound field; a determiner that determines a virtual boundary that includes two or more lattice points surrounding the user, based on the position of the user which has been obtained, the two or more lattice points being among a plurality of lattice points set at predetermined intervals within the three-dimensional sound field; a reader that reads, from a database that stores propagation characteristics of the sound from the sound source to the plurality of lattice points, the propagation characteristics of the sound from the sound source to the two or more lattice points included in the virtual boundary determined; a calculator that calculates transfer functions of the sound from the two or more lattice points included in the virtual boundary determined to the position of the user; and a generator that generates the output sound signal by processing the sound information using the propagation characteristics read and the transfer functions calculated.

Moreover, an acoustic reproduction system according to one aspect of the present disclosure includes: the above-described information processing device; and a driver that reproduces the output sound signal generated.

Furthermore, one aspect of the present disclosure can also be implemented as a non-transitory computer-readable recording medium for use in a computer, the recording medium having recorded thereon a computer program for causing the computer to execute the above-described information processing method.

Note that these general or specific aspects may be implemented by a system, a device, a method, an integrated circuit, a computer program, or a non-transitory recording medium such as a computer-readable CD-ROM, or by any optional combination of systems, devices, methods, integrated circuits, computer programs, and recording media.

Advantageous Effects

The present disclosure can more appropriately generate an output sound signal in terms of reducing an amount of processing.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
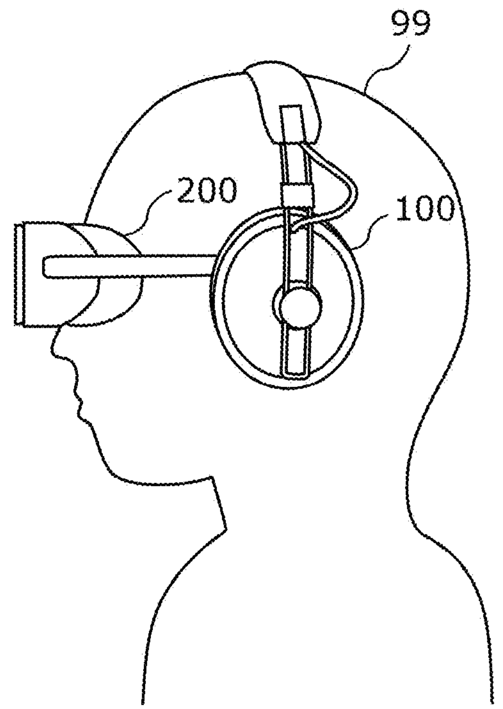
FIG. 1 is a schematic diagram illustrating a use case of an acoustic reproduction system according to an embodiment.

DESCRIPTION OF EMBODIMENTS (Underlying Knowledge Forming Basis of the Present Disclosure)

Techniques relating to acoustic reproduction for causing a user to perceive three-dimensional sounds within a virtual three-dimensional space (hereinafter, may be called a three-dimensional sound field) have been conventionally known (for example, see PTL 1). With these techniques, the user can perceive as if (i) a sound source object is present at a predetermined position within a virtual space and (ii) a sound is arriving from a direction in which the sound source object is present. In order to localize a sound image at a predetermined position within a virtual three-dimensional space as described above, it is necessary to perform calculation processing on a sound signal of a sound source object to cause, for example, a difference in sound arrival time between both ears and a difference in sound level (or a difference in sound pressure) between both ears so that a sound is perceived as a three-dimensional sound. Such calculation processing is performed by application of a three-dimensional acoustic filter. The three-dimensional acoustic filter is a filter for information processing to cause a user to three-dimensionally perceive the position of a sound including a direction and a distance, the size of a sound source, and the size of a space, when an output sound signal obtained after the three-dimensional acoustic filter is applied to the original sound information is reproduced.

As one example of calculation processing to be performed when such a three-dimensional acoustic filter is applied, processing of convolving a head-related transfer function with a target sound signal has been known to cause a sound to be perceived as arriving from a predetermined position. Performance of this processing of convolving head-related transfer functions at an adequately narrow angle with respect to a sound arrival direction in which a sound arrives from the position of a sound source object to the position of a user enhances the sense of realism to be experienced by the user.

Moreover, development of techniques relating to virtual reality (VR) has been actively taking place in recent years. In VR, the prime purpose is to appropriately change the position of a sound object within a virtual three-dimensional space in response to a movement made by a user so that the user can experience as if the user is moving within the virtual space. In order to achieve the foregoing, it is necessary to relatively move the localization position of a sound image within the virtual space in response to a movement made by the user. Such processing has been performed by applying, to original sound information, a three-dimensional acoustic filter such as the above-mentioned head-related transfer function. However, when the user moves within a three-dimensional space, a transmission path of a sound momentarily changes for each of positional relationships between a sound source object and the user due to reverberations and the interference of sound. In this case, every time the user moves, a transmission path of a sound from the sound source object is determined based on a positional relationship between the sound source object and the user, and a transfer function is convolved with consideration given to reverberations and the interference of sound. This results in an enormous amount of processing, and only a large-scale processing device can enhance the sense of realism.

In view of the above, the present disclosure sets lattice points at intervals greater than or equal to predetermined intervals determined by a wavelength of a sound signal to be reproduced within a three-dimensional sound field, and calculates, in advance, propagation characteristics of a sound based on propagation paths of the sound from a sound source object to the lattice points. With this, the calculated propagation characteristics of the sound up to lattice points close to the user can be used. Accordingly, an amount of calculation processing can be significantly reduced. Thereafter, only the transmission of the sound from the lattice points to the user is to be processed using head-related transfer functions. With this, an amount of processing from the sound source object to a position of the user can be reduced while maintaining the sense of realism. Based on such knowledge, the present disclosure aims to provide an information processing method, etc., to more appropriately generate an output sound signal in terms of reducing an amount of processing.

Furthermore, the present disclosure has the benefit of being able to generate an appropriate output sound signal even if intervals between points surrounding a user in a virtual space for which propagation characteristics are to be calculated in advance are greater than a wavelength of a sound intended to be generated. A configuration that can provide this benefit will be described in an embodiment below.

The following presents a more specific outline of the present disclosure.

An information processing method according to aspect 1 of the present disclosure is an information processing method of generating, by processing sound information, an output sound signal for causing a user to perceive a sound as arriving from a sound source within a three-dimensional sound field that is virtual. The information processing method is executed by a computer. The information processing method includes: obtaining a position of the user within the three-dimensional sound field; determining a virtual boundary that includes two or more lattice points surrounding the user, based on the position of the user which has been obtained, the two or more lattice points being among a plurality of lattice points set at predetermined intervals within the three-dimensional sound field; reading, from a database that stores propagation characteristics of the sound from the sound source to the plurality of lattice points, the propagation characteristics of the sound from the sound source to the two or more lattice points included in the virtual boundary determined; calculating transfer functions of the sound from the two or more lattice points included in the virtual boundary determined to the position of the user; and generating the output sound signal by processing the sound information using the propagation characteristics read and the transfer functions calculated.

According to the above-described information processing method, propagation characteristics of a sound from a sound source to a plurality of lattice points only need to be read from a database. Accordingly, such propagation characteristics need not be newly calculated, and thus an amount of calculation processing is reduced. What's more, among the plurality of lattice points, a virtual boundary that surrounds a user is determined and transfer functions of the sound from the lattice points on the determined virtual boundary to the user are calculated, to generate an output sound signal using the propagation characteristics read from the database and the calculated transfer functions. As described, the present aspect can more appropriately generate an output sound signal in terms of reducing an amount of processing.

In addition, an information processing method according to aspect 2 is the information processing method according to aspect 1, where the information processing method further includes: determining an interpolation point that is on the virtual boundary and is between the two or more lattice points; and calculating an interpolation propagation characteristic of the sound from the sound source to the interpolation point determined, based on the propagation characteristics read. The calculating of the transfer functions includes calculating the transfer functions of the sound from the two or more lattice points to the position of the user and a transfer function of the sound from the interpolation point determined to the position of the user, the two or more lattice points and the interpolation point determined being included in the virtual boundary. The generating of the output sound signal includes generating the output sound signal by processing the sound information using the propagation characteristics read, the interpolation propagation characteristic calculated, and the transfer functions calculated.

According to the above, in addition to calculating the transfer functions of the sound from the two or more lattice points on the determined virtual boundary to the position of a user, an output sound signal can be generated by further calculating a transfer function of the sound from an interpolation point between the two or more lattice points to the position of the user. A propagation characteristic of the sound from a sound source to the interpolation point can also be calculated from propagation characteristics of the sound from the sound source to lattice points surrounding the interpolation point. Accordingly, an increase in the amount of processing due the addition of the interpolation point is relatively small. Meanwhile, the benefit of adding an interpolation point is great. Specifically, an upper limit of a frequency of a sound that can be physically and accurately presented is solely determined by intervals set between original lattice points. However, an addition of an interpolation point between lattice points allows generation of an output sound signal that can be accurately presented also for sound information including a sound in a frequency band exceeding the upper limit of the frequency determined by the interval between the lattice points. Accordingly, an output sound signal can be more appropriately generated, not only in terms of reducing an amount of processing, but also in terms of a frequency band capable of presenting a sound.

Moreover, an information processing method according to aspect 3 is the information processing method according to aspect 1 or 2, where the information processing method further includes: making a gain adjustment for the propagation characteristics read. The gain adjustment includes: adjusting, to a first gain, a propagation characteristic of a lattice point that is closest to a first intersection closer to the sound source than a second intersection is, the propagation characteristic being among the propagation characteristics read, the first intersection being among intersections at which the virtual boundary and a straight line connecting the sound source and the position of the user intersect; adjusting, to a second gain, a propagation characteristic of a lattice point that is closest to the second intersection opposing the first intersection with the user interposed between the first intersection and the second intersection, the propagation characteristic being among the propagation characteristics read; and adjusting to cause (i) the first gain to be greater than the second gain and (ii) a difference between the first gain and the second gain to increase as a distance between the user and the sound source increases. In the generating of the output sound signal, the propagation characteristics for which the gain adjustment has been made are used.

According to the above, a gain adjustment can emphasize the sense of sound direction. For example, when it appears difficult for a user to perceive the sense of sound direction when sound information is processed using only a read propagation characteristic and a calculated transfer function, the sense of sound direction can be emphasized by further making a gain adjustment according to the present aspect to cause the user to perceive the sense of sound direction. The sense of sound source direction heightens when a first gain of a lattice point on the sound source side is greater than a second gain of a lattice point that opposes the lattice point on the sound source side with the user interposed between the lattice points. The lattice point on the sound source side is closer to the sound source than the lattice point that opposes the lattice point on the sound source side is to the sound source. Since the sense of sound direction is more readily perceived for a shorter distance between the user and the sound source and the sense of sound direction is less readily perceived for a longer distance between the user and the sound source, a difference between the first gain and the second gain is increased as a distance between the user and the sound source increases. Accordingly, a gain adjustment can compensate the sense of sound direction that is less readily perceived in accordance with a distance between a user and a sound source.

Furthermore, an information processing method according to aspect 4 is the information processing method according to any one of aspects 1 to 3, where the information processing method further includes: determining an interpolation point that is on the virtual boundary and is between the two or more lattice points; calculating an interpolation propagation characteristic of the sound from the sound source to the interpolation point determined, based on the propagation characteristics read; and making a gain adjustment for the propagation characteristics read and the interpolation propagation characteristic calculated. The calculating of the transfer functions includes calculating the transfer functions of the sound from the two or more lattice points to the position of the user and a transfer function of the interpolation point determined to the position of the user. The two or more lattice points and the interpolation point determined are included in the virtual boundary. The generating of the output sound signal includes generating the output sound signal by processing the sound information using the propagation characteristics to which the gain adjustment has been made, the interpolation propagation characteristic to which the gain adjustment has been made, and the transfer functions calculated. The making of the gain adjustment includes (i) adjusting, to a first gain, a propagation characteristic of a lattice point closest to a first intersection or the interpolation propagation characteristic of an interpolation point closest to the first intersection, the propagation characteristic being among the propagation characteristics read, the first intersection being closer to the sound source than a second intersection is and being among intersections at which the virtual boundary and a straight line connecting the sound source and the position of the user intersect and (ii) adjusting, to a second gain, a propagation characteristic of a lattice point closest to the second intersection or the interpolation propagation characteristic of an interpolation point closest to the second intersection, the second intersection opposing the first intersection with the user interposed between the first intersection and the second intersection. The first gain is greater than the second gain and a difference between the first gain and the second gain increases as a distance between the user and the sound source increases.

According to the above, in addition to calculating the transfer functions of the sound from the two or more lattice points on the determined virtual boundary to the position of a user, an output sound signal can be further generated by calculating a transfer function of a sound from an interpolation point between the two or more lattice points to the position of the user. A propagation property of the sound from a sound source to the interpolation point can be calculated from propagation properties of the sound from the sound source to lattice points surrounding the interpolation point. Accordingly, an increase in the amount of processing due the addition of the interpolation point is relatively small. Meanwhile, a benefit of adding the interpolation point is great. Specifically, the upper limit of a frequency at which physically accurate presentation of a sound is possible is determined solely from an interval set between original lattice points. However, addition of an interpolation point between these lattice points allows generation of an output sound signal that can accurately present sound information including a sound in a frequency band exceeding the upper limit of the frequency determined by the interval between the lattice points. Accordingly, an output sound signal can be more appropriately generated, in terms of not only reducing an amount of processing, but also a frequency band capable of presenting a sound. In the present aspect, a gain adjustment can further emphasize the sense of sound direction. For example, when it appears difficult for a user to perceive the sense of sound direction when sound information is processed using only a read propagation characteristic and a calculated transfer function, a gain adjustment according to the present aspect can be further made to emphasize the sense of sound direction to cause the user to perceive the sense of sound direction. The sense of sound source direction heightens when a first gain of a lattice point or an interpolation point on the sound source side is greater than a second gain of a lattice point or an interpolation point that opposes the lattice point on the sound source side with the user interposed between the lattice points. The lattice point or the interpolation point on the sound source side is closer to the sound source than the lattice point or the interpolation point that opposes the lattice point or the interpolation point on the sound source side is to the sound source. Since the sense of sound direction is more readily perceived for a shorter distance between the user and the sound source and the sense of sound direction is less readily perceived for a longer distance between the user and the sound source, a difference between the first gain and the second gain is increased as a distance between the user and the sound source increases. Accordingly, a gain adjustment can compensate the sense of sound direction that is less readily perceived in accordance with a distance between a user and a sound source.

In addition, an information processing method according aspect 5 is the information processing method according to any one of aspects 1 to 4. In the information processing, the virtual boundary is a circle or a sphere that passes through all of the two or more lattice points.

According to the above, a transfer function of a sound from lattice points (or lattice points and interpolation points) within a virtual boundary to a user can be calculated as a transfer function from each of points on a circle or a sphere to the position of a user inside the virtual boundary. An existing transfer function database containing calculated transfer functions from each point on a circle or a sphere to positions of a user has been known, and such an existing database can be applied to the calculation of transfer functions of a sound from lattice points (or lattice points and interpolation points) to the user. In other words, application of such a database allows transfer functions of a sound from lattice points (or lattice points and interpolation points) to the user to be calculated by only consulting the database. Accordingly, an output sound signal can be more appropriately generated in terms of reducing an amount of processing.

Moreover, a recording medium according to aspect 6 is a non-transitory computer-readable recording medium for use in a computer, the recording medium having recorded thereon a computer program for causing the computer to execute the information processing method according to any one of aspects 1 to 5.

Furthermore, an information processing device according to aspect 7 is an information processing device that generates, by processing sound information, an output sound signal for causing a user to perceive a sound as arriving from a sound source within a three-dimensional sound field that is virtual. The information processing device includes: an obtainer that obtains a position of the user within the three-dimensional sound field; a determiner that determines a virtual boundary that includes two or more lattice points surrounding the user, based on the position of the user which has been obtained, the two or more lattice points being among a plurality of lattice points set at predetermined intervals within the three-dimensional sound field; a reader that reads, from a database that stores propagation characteristics of the sound from the sound source to the plurality of lattice points, the propagation characteristics of the sound from the sound source to the two or more lattice points included in the virtual boundary determined; a calculator that calculates transfer functions of the sound from the two or more lattice points included in the virtual boundary determined to the position of the user; and a generator that generates the output sound signal by processing the sound information using the propagation characteristics read and the transfer functions calculated.

According to the above, the information processing device can produce the same advantageous effects as the above-described information processing method.

In addition, an acoustic reproduction system according to aspect 8 includes the information processing device according to aspect 7 and a driver that reproduces the output sound signal generated.

According to the above, the acoustic reproduction system can produce the same advantageous effects as the above-described information processing method, and can reproduce an output sound signal.

Furthermore, it should be noted that these general or specific aspects may be implemented by a system, a device, a method, an integrated circuit, a computer program, or a non-transitory recording medium such as a computer-readable CD-ROM, or by any optional combination of systems, devices, methods, integrated circuits, computer programs, and recording media.

Hereinafter, embodiments will be described in detail with reference to the drawings. Note that the embodiments below each describe a general or specific example. The numerical values, shapes, materials, elements, the arrangement and connection of the elements, steps, orders of the steps, etc. presented in the embodiments below are mere examples and are not intended to limit the present disclosure. In addition, among the elements in the embodiments below, those not recited in any one of the independent claims will be described as optional elements. Note that the drawings are schematic diagrams, and do not necessarily provide strictly accurate illustration. Throughout the drawings, the same reference sign is given to substantially the same element, and redundant description is omitted or simplified.

Moreover, ordinal numbers, such as first, second, and third, may be given to elements in the description below. However, these ordinal numbers are given to the elements for identification of the elements, and therefore do not necessarily correspond to significant orders. These ordinal numbers may be replaced, newly given, or removed as appropriate.

Embodiment

[Outline]

First, an outline of an acoustic reproduction system according to an embodiment will be described. FIG. 1 is a schematic diagram illustrating a use case of an acoustic reproduction system according to the embodiment. FIG. 1 shows user 99 who uses acoustic reproduction system 100.

Acoustic reproduction system 100 shown in FIG. 1 is used simultaneously with three-dimensional video reproduction device 200. Watching three-dimensional images and listening to three-dimensional sounds at the same time cause the images and the sounds to enhance the sense of auditory realism and the sense of visual realism, respectively, and thus a user can experience as if the user is at a site at which the images and the sounds are captured. For example, when images (dynamic image) that capture a person having a conversation are displayed and the localization of sound images of the conversation sounds do not match the person's mouth movements, user 99 still perceives the conversation sounds as conversation sounds uttered from the person's mouth. As described above, visual information can, for example, correct the positions of sound images, and images and sounds together may enhance the sense of realism.

Three-dimensional video reproduction device 200 is an image display device to be worn on the head of user 99. Accordingly, three-dimensional video reproduction device 200 moves together with the head of user 99. For example, three-dimensional video reproduction device 200 is an eyeglass-type device supported by the ears and the nose of user 99 as shown in the diagram.

Three-dimensional video reproduction device 200 changes an image to be displayed in response to a movement of the head of user 99 to cause user 99 to perceive as if user 99 is moving their head within a three-dimensional image space. Specifically, when an object within the three-dimensional image space is located in front of user 99, the object moves in the left direction with respect to user 99 when user 99 turns to the right, and the object moves in the right direction with respect to user 99 when user 99 turns to the left. As described above, three-dimensional video reproduction device 200 causes, in response to a movement made by user 99, a three-dimensional image space to move in a direction opposite the movement made by user 99.

Three-dimensional video reproduction device 200 displays two images with parallax differences for the left and right eyes of user 99. Based on these parallax differences between the displayed images, user 99 can perceive the three-dimensional position of an object in the images. Note that when user 99 uses acoustic reproduction system 100 with their eyes closed, such as when acoustic reproduction system 100 is used to reproduce healing sounds for inducing sleep, three-dimensional video reproduction device 200 need not be simultaneously used with acoustic reproduction system 100. In other words, three-dimensional video reproduction device 200 is not an essential element for the present disclosure. Besides dedicated video display devices, general-purpose mobile terminals, such as a smartphone and a tablet device owned by user 99, may be used as three-dimensional video reproduction device 200.

Such general-purpose mobile terminals include, besides a display for displaying videos, various types of sensors to detect an orientation and a movement of the terminal. Such general-purpose mobile terminals further include a processor for information processing, and is capable of transmitting and receiving information to and from a server device such as a cloud server by being connected to a network. In other words, three-dimensional video reproduction device 200 and acoustic reproduction system 100 can also be implemented by a combination of a smartphone and a general-purpose headphone or the like without an information processing function.

In the same manner as the above example, three-dimensional video reproduction device 200 and acoustic reproduction system 100 may be implemented by appropriately arranging, in one or more devices, a head movement detection function, a video presentation function, a video information processing function for presentation, a sound presentation function, and a sound information processing function for presentation. When three-dimensional video reproduction device 200 is not necessary, the head movement detection function, the sound presentation function, and the sound information processing function for presentation are to be appropriately arranged in one or more devices. For example, a processing device such as a computer or a smartphone having the sound information processing function for presentation and a headphone or the like having the head movement detection function and sound presentation function can implement acoustic reproduction system 100.

Acoustic reproduction system 100 is a sound presentation device to be worn on the head of user 99. Accordingly, acoustic reproduction system 100 moves together with the head of user 99. For example, acoustic reproduction system 100 according to the present embodiment is the so-called over-ear headphone-type device. Note that the form of acoustic reproduction system 100 is not particularly limited. For example, acoustic reproduction system 100 may be two earplug-type devices individually worn in the left and right ears of user 99.

Acoustic reproduction system 100 changes a sound to be presented in response to a movement of the head of user 99 to cause user 99 to perceive as if user 99 is moving their head within a three-dimensional sound field. For this reason, acoustic reproduction system 100 causes, in response to a movement made by user 99, the three-dimensional sound field to move in the direction opposite the movement made by user 99 as described above.

Here, when user 99 moves within the three-dimensional sound field, the relative position of a sound source object changes with respect to a position of user 99 within the three-dimensional sound field. In this case, calculation processing based on the position of the sound source object and the position of user 99 needs to be performed every time user 99 moves to generate an output sound signal for reproduction. Since such processing is typically troublesome, propagation characteristics of a sound from a sound source object to preset lattice points within a three-dimensional sound field are calculated in advance in the present disclosure. Acoustic reproduction system 100 makes use of these calculation results. With this, acoustic reproduction system 100 can generate output sound information with relatively small amount of calculation processing of calculating transmission of a sound from the lattice points to the position of user 99. Note that such calculation results of calculating propagation characteristics are calculated in advance for each of sound source objects and are stored in a database. In accordance with the position of user 99, a propagation characteristic of a lattice point that is close to the position of user 99 within a three-dimensional space is read from among the propagation characteristics in the database, and is used for processing sound information.

[Configuration]

Figure 2:
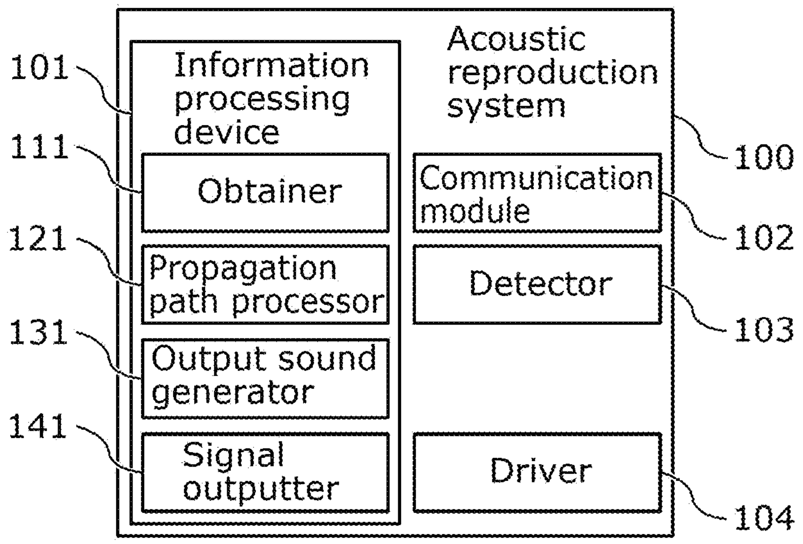
FIG. 2 is a block diagram illustrating a functional configuration of the acoustic reproduction system according to the embodiment.

Next, a configuration of acoustic reproduction system 100 according to the embodiment will be described with reference to FIG. 2. FIG. 2 is a block diagram illustrating a functional configuration of the acoustic reproduction system according to the embodiment.

As illustrated in FIG. 2, acoustic reproduction system 100 according to the present embodiment includes information processing device 101, communication module 102, detector 103, and driver 104.

Information processing device 101 is an arithmetic calculation device for performing various types of signal processing in acoustic reproduction system 100. Information processing device 101 includes, for example, a processor and memory for a computer or the like, and is implemented by the processor executing programs stored in the memory. Functions pertaining to each of functional units are carried out by execution of these programs. These functional units will be hereinafter described.

Information processing device 101 includes obtainer 111, propagation path processor 121, output sound generator 131, and signal outputter 141. Details of the functional units included in information processing device 101 will be hereinafter described, together with details of the elements other than information processing device 101.

Communication module 102 is an interface device for receiving an input of sound information into acoustic reproduction system 100. Communication module 102 includes, for example, an antenna and a signal converter, and receives sound information from an external wireless communication. More specifically, device through communication module 102 receives, via the antenna, a radio signal indicating the sound information which has been converted into a format for wireless communication, and reconverts the radio signal into the sound information using the signal converter. With this, acoustic reproduction system 100 obtains the sound information from the external device through wireless communication. The sound information obtained by communication module 102 is obtained by obtainer 111. As described above, the sound information is input into information processing device 101. Note that acoustic reproduction system 100 may communicate with the external device through wired communication.

Sound information to be obtained by acoustic reproduction system 100 is encoded in a predetermined format, such as MPEG-H 3D Audio (ISO/IEC 23008-3). As one example, encoded sound information contains (i) information pertaining to a predetermined sound to be reproduced by acoustic reproduction system 100 and (ii) information pertaining to a localization position used when a sound image of the sound is caused to localize at a predetermined position (i.e., to cause the sound to be perceived as a sound arriving from a predetermined direction) within a three-dimensional sound field. For example, the sound information contains a plurality of sounds including a first predetermined sound and a second predetermined sound, and sound images generated when these sounds are reproduced are caused to localize such that these sounds are perceived as arriving from different positions within the three-dimensional sound field.

These three-dimensional sounds, together with images visually identified using, for example, three-dimensional video reproduction device 200, enhance the sense of realism of content viewed. Note that the sound information may only contain information pertaining to predetermined sounds. In this case, information pertaining to predetermined positions may be separately obtained. In addition, although the sound information contains first sound information pertaining to a first predetermined sound and second sound information pertaining to a second predetermined sound as described above, a plurality of sound information items each containing a different one of the foregoing sound information items may be obtained, and sound images may be localized at different positions within a three-dimensional sound field by simultaneously reproducing the plurality of sound information items. As described above, a form of sound information to be input is not particularly limited. Acoustic reproduction system 100 is to include obtainer 111 according to sound information in various forms.

Figure 3:
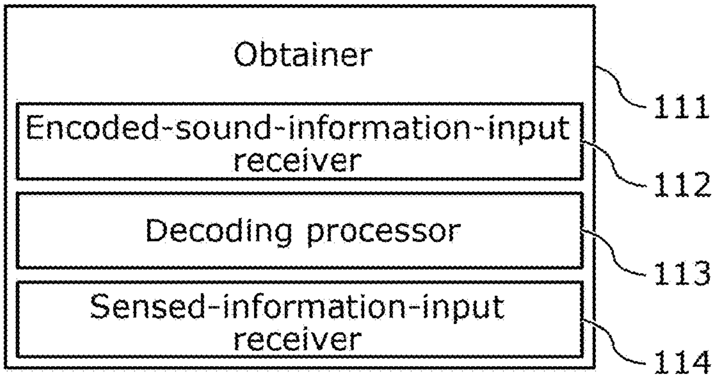
FIG. 3 is a block diagram illustrating a functional configuration of an obtainer according to the embodiment.

Here, one example of obtainer 111 will be described with reference to FIG. 3. FIG. 3 is a block diagram illustrating a functional configuration of the obtainer according to the embodiment. As illustrated in FIG. 3, obtainer 111 according to the present embodiment includes, for example, encoded-sound-information-input receiver 112, decoding processor 113, and sensed-information-input receiver 114.

Encoded-sound-information-input receiver 112 is a processor into which encoded sound information obtained by obtainer 111 is input. Encoded-sound-information-input receiver 112 outputs the input sound information to decoding processor 113. Decoding processor 113 is a processor that decodes the sound information output from encoded-sound-information-input receiver 112 to generate information pertaining to predetermined sounds contained in the sound information and information pertaining to predetermined positions contained in the sound information in a format used in subsequent processing. Sensed-information-input receiver 114 will be hereinafter described, together with a function of detector 103.

Detector 103 is a device for detecting a head movement speed of user 99. Detector 103 includes a combination of various types of sensors used for movement detection, such as a gyro sensor and an acceleration sensor. In the present embodiment, detector 103 is included in acoustic reproduction system 100, but detector 103 may be included in an external device, such as three-dimensional video reproduction device 200 that moves in response to a head movement made by user 99 in the same manner as acoustic reproduction system 100. In this case, detector 103 need not be included in acoustic reproduction system 100. Moreover, an external image capturing device may be used as detector 103 to detect a movement made by user 99 by capturing an image of a head movement made by user 99 and processing the captured image.

For example, detector 103 is integrally secured to the housing of acoustic reproduction system 100 to detect a movement speed of the housing. Since acoustic reproduction system 100 including the above-described housing moves together with the head of user 99 after user 99 wears acoustic reproduction system 100, detector 103 can detect a head movement speed of user 99 as a consequence.

For example, as an amount of head movements made by user 99, detector 103 may detect an amount of turns made about at least one axis that is taken as the rotational axis among three axes orthogonal to one another within a three-dimensional space, or may detect an amount of displacement in the direction of at least one axis that is taken as a displacement direction among the three axes. Moreover, as an amount of head movements made by user 99, detector 103 may detect both an amount of turns and an amount of displacement.

Sensed-information-input receiver 114 obtains a head movement speed of user 99 from detector 103. More specifically, sensed-information-input receiver 114 obtains, as a head movement speed of user 99, an amount of head movements made by user 99 which is detected per unit time by detector 103. As has been described above, sensed-information-input receiver 114 obtains at least one of a turning speed and a displacement speed from detector 103. An amount of head movements made by user 99 obtained here is used to determine the position and posture (stated differently, coordinates and orientation) of user 99 within a three-dimensional sound field. Acoustic reproduction system 100 determines a relative position of a sound image based on the determined coordinates and the determined orientation of user 99, and reproduces a sound. Specifically, propagation path processor 121 and output sound generator 131 implement the above functions.

Propagation path processor 121 is a processor that determines, based on the above-mentioned coordinates and orientation of user 99, whether to cause user 99 to perceive a predetermined sound as a sound arriving from any one of directions within a three-dimensional sound field, and prepares several information items to process sound information such that output sound information to be reproduced as described above will be a sound as described above.

As the several information items, propagation path processor 121 reads propagation characteristics of a sound from a sound source object to lattice points, generates interpolation propagation characteristics of the sound from the sound source to interpolation points, calculates transfer functions of the sound from the lattice points or the interpolation points to user 99, and outputs all of the foregoing information items.

Figure 4:
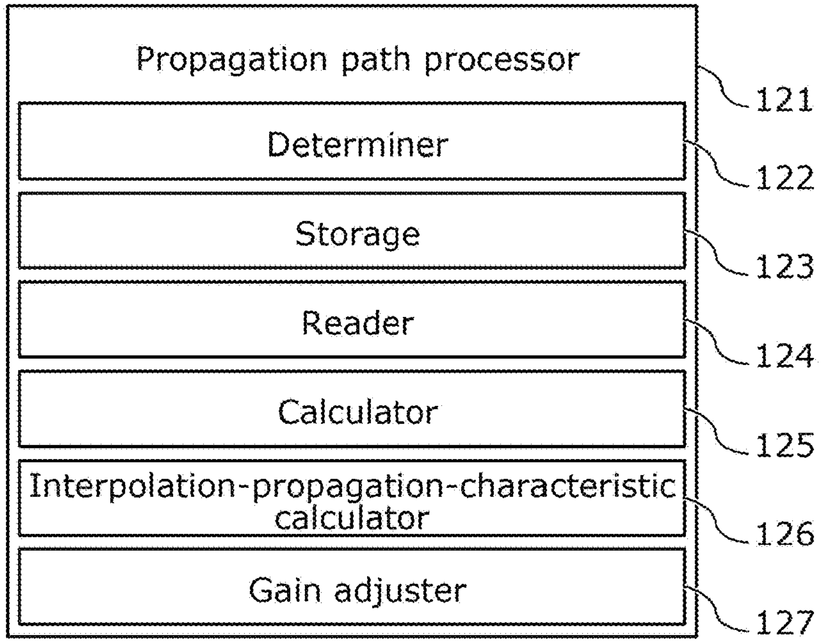
FIG. 4 is a block diagram illustrating a functional configuration of a propagation path processor according to the embodiment.

Hereinafter, one example of propagation path processor 121 will be described with reference to FIG. 4, together with the information items that will be output from propagation path processor 121. FIG. 4 is a block diagram illustrating a functional configuration of the propagation path processor according to the embodiment. As illustrated in FIG. 4, propagation path processor 121 according to the present embodiment includes, for example, determiner 122, storage 123, reader 124, calculator 125, interpolation-propagation-characteristic calculator 126, and gain adjuster 127.

Determiner 122 determines, based on the coordinates of user 99, a virtual boundary that includes two or more lattice points surrounding user 99. The two or more lattice points are among lattice points that are set at predetermined intervals within a three-dimensional sound field and are located on contact points of adjacent lattice cells in a plurality of lattice cells. The virtual boundary extends over the plurality of lattice cells, and is, for example, in a circular shape in plan view or in a spherical shape in three-dimensional view. Although the virtual boundary need not be in a circular shape or in a spherical shape, the virtual boundary in a circular shape or a spherical shape provides benefit of allowing a typical head-related transfer function database to be used by a calculator, as will be described later in the embodiment.

If a virtual boundary is set in the manner described in the present embodiment, the same virtual boundary can be continuously applied even if user 99 moves, as long as user 99 moves within the virtual boundary. However, when user 99 largely moves so as to exceed the virtual boundary, a new virtual boundary will be determined in accordance with the coordinates of user 99 after the movement. Stated differently, the virtual boundary moves following user 99. While the same virtual boundary is applied, the same propagation characteristics of a sound from a sound source to the lattice points can be continuously used in sound information processing. Accordingly, the application of the same virtual boundary is effective in terms of reducing an amount of calculation processing. As will be described in more detail later in the embodiment, the virtual boundary is the incircle inscribed in a quadrilateral composed of four lattice cells or the insphere inscribed in a parallelepiped composed of eight three-dimensional lattice cells. With this, the virtual boundary includes four lattice points in plan view and eight lattice points in three-dimensional view. Accordingly, propagation characteristics of a sound from a sound source to these lattice points can be used.

Storage 123 is a storage controller that performs processing of storing information in a storage device (not illustrated) that stores information and processing of reading information. The storage device stores, as a database, propagation characteristics of sounds from a sound source object to respective lattice points which have been calculated in advance and stored by storage 123. Storage 123 reads, from the storage device, propagation characteristics of optional lattice points.

Reader 124 controls storage 123 to read propagation characteristics in accordance with information on necessary lattice points.

Calculator 125 calculates transfer functions of a sound from lattice points included in a determined virtual boundary (points on the virtual boundary) to the coordinates of user 99. Based on relative positions between the coordinates of user 99 and the lattice points, calculator 125 calculates the transfer functions by reading corresponding transfer functions from a head-related-transfer-function database. Moreover, calculator 125 similarly calculates transfer functions of the sound from interpolation points to the coordinates of user 99. The interpolation points will be hereinafter described.

Interpolation-propagation-characteristic calculator 126 determines the interpolation points on the virtual boundary each of which is located between the two or more of the lattice points on the virtual boundary, and calculates propagation characteristics of the sound from the sound source object to the interpolation points by performing arithmetic calculations. These arithmetic calculations use, however, the propagation characteristics of the sound from the sound source object to lattice points read by reader 124. Since the foregoing arithmetic calculations may further use information on propagation characteristics of the sound from the sound source object to lattice points not included in the virtual boundary, interpolation-propagation-characteristic calculator 126 may control storage 123 to read propagation characteristics in accordance with information on necessary lattice points.

Gain adjuster 127 is a processor that further performs gain adjustment processing on the read propagation characteristics to enhance the sense of sound direction. Gain adjuster 127 performs gain adjustment processing on the propagation characteristics of the sound from the sound source object to the lattice points which have been read by reader 124, based on the coordinates of the lattice points, the coordinates of the sound source object, and the coordinates of user 99.

The elements included in propagation characteristic processor 121 will be further described later in the embodiment, together with the description of operations performed by information processing device 101.

Output sound generator 131 is one example of a generator, and is a processor that generates an output sound signal by processing information pertaining to a predetermined sound included in sound information.

Figure 5:
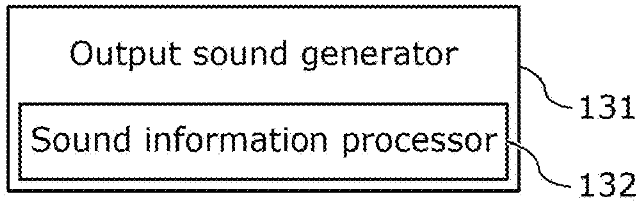
FIG. 5 is a block diagram illustrating a functional configuration of an output sound generator according to the embodiment.

Here, one example of output sound generator 131 will be described with reference to FIG. 5. FIG. 5 is a block diagram illustrating a functional configuration of the output sound generator according to the embodiment. As illustrated in FIG. 5, output sound generator 131 according to the present embodiment includes, for example, sound information processor 132. Sound information processor 132 processes sound information using propagation characteristics of a sound from a sound source object to lattice points, interpolation propagation characteristics of the sound from the sound source object to interpolation points, transfer functions of the sound from the lattice points or the interpolation points to user 99 which are output by propagation characteristic processor 121, to perform arithmetic calculation processing such that a predetermined sound is perceived as arriving, at user 99, from the coordinates of the sound source object, together with characteristics including reverberations, interference of the sound, etc. Thereafter, sound information processor 132 generates an output sound signal as a result of the arithmetic calculation.

Note that sound information processor 132 sequentially reads information that propagation characteristic processor 121 consecutively generates, and consecutively outputs, based on the information items that pertain to temporally corresponding predetermined sounds on a time axis, output sound signals whose arrival directions from which the predetermined sounds arrive in a three-dimensional sound field are controlled. As described above, sound information items divided by processing time units on the timeline are output as consecutive output sound signals on the timeline.

Signal outputter 141 is a functional unit that outputs a generated output sound signal to driver 104. Signal outputter 141 converts, based on the output sound signal, a digital signal into an analog signal to generate a waveform signal, causes driver 104 to generate a sound wave based on the waveform signal, and presents a sound to user 99. Driver 104 includes, for example, a diaphragm, a magnet, and a driving mechanism such as a voice coil. Driver 104 causes the driving mechanism to operate in accordance with the waveform signal to cause the driving mechanism to vibrate the diaphragm. As described above, driver 104 generates a sound wave by vibration produced by the diaphragm in accordance with an output sound signal (the foregoing indicates "reproduction" of an output sound signal, or more specifically, the meaning of "reproduction" does not include perception of a sound by user 99), the sound wave propagates through the air and transfers to the ear of user 99, and user 99 perceives a sound.

[Operation]

Figure 6:
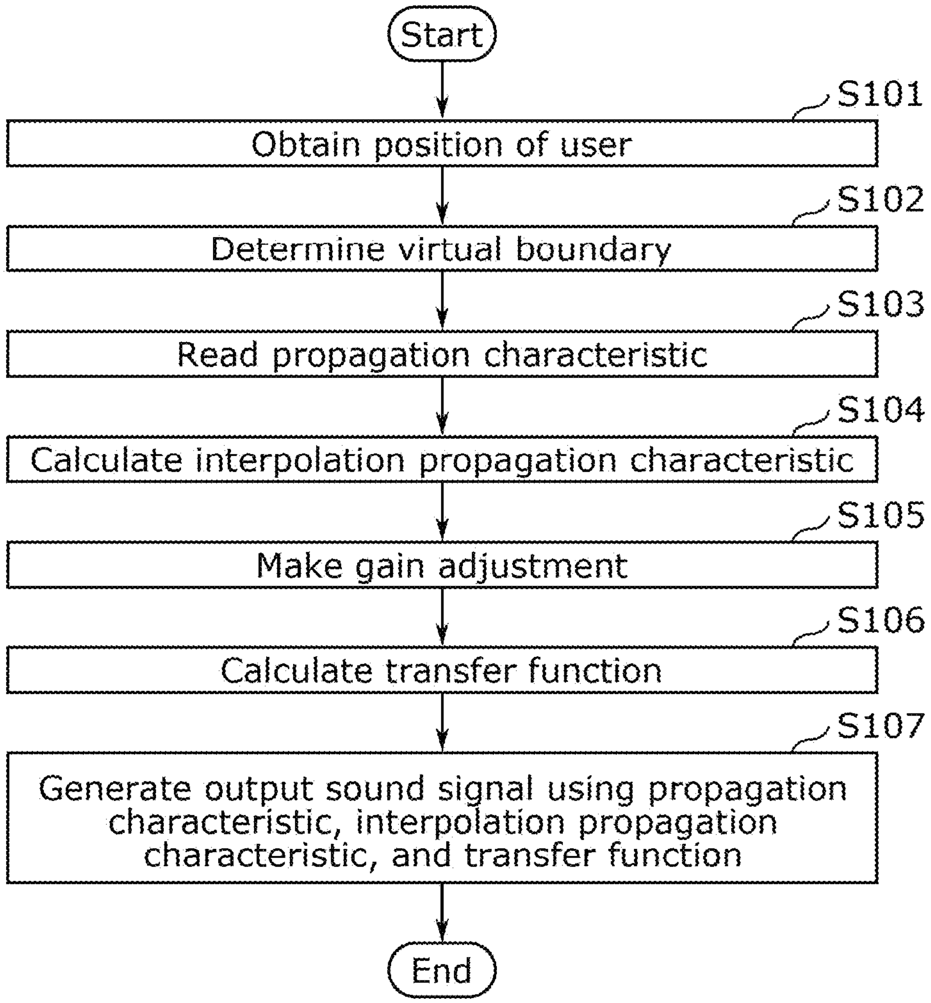
FIG. 6 is a flowchart illustrating operations performed by an information processing device according to the embodiment.
Figure 7:
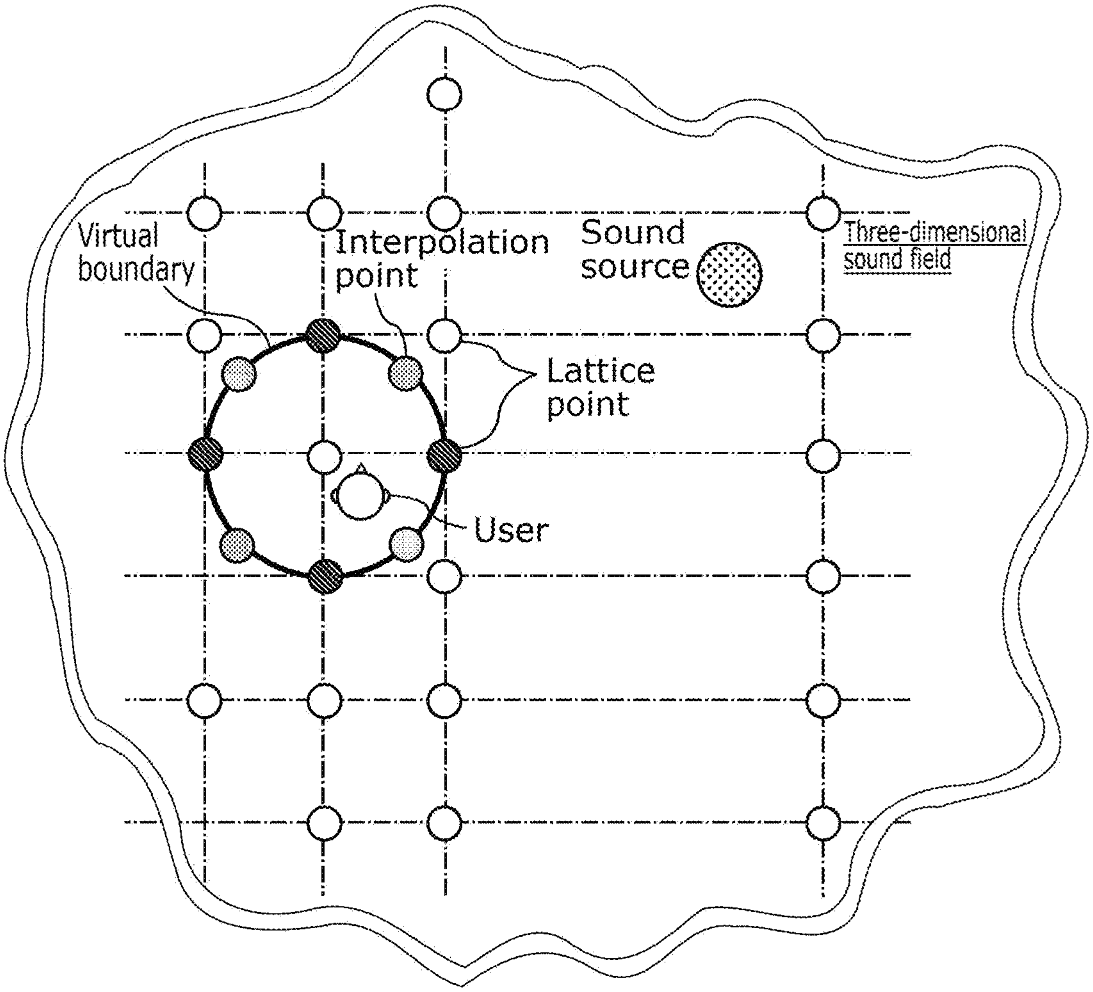
FIG. 7 is a diagram illustrating interpolation points according to the embodiment.
Figure 8A:
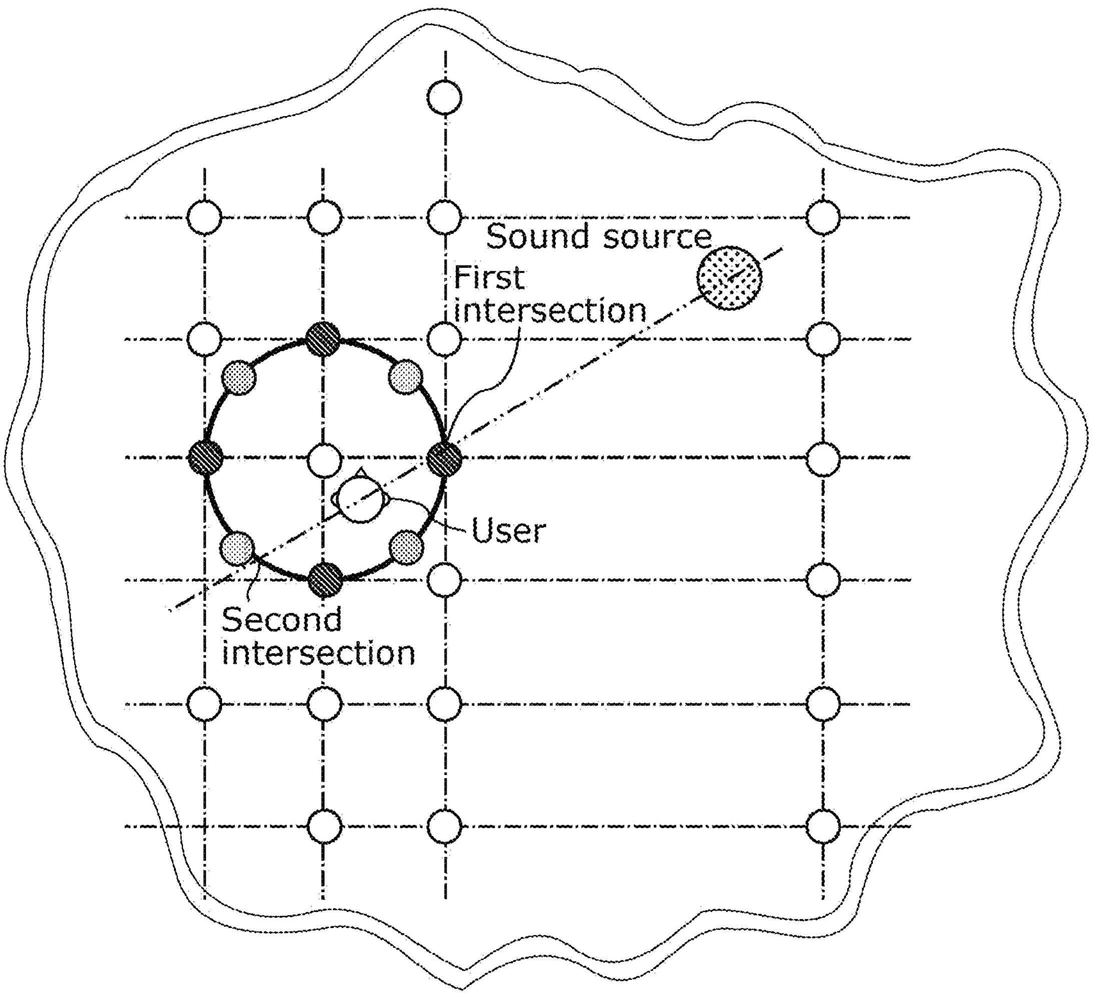
FIG. 8A is a diagram illustrating a gain adjustment according to the embodiment.
Figure 8B:
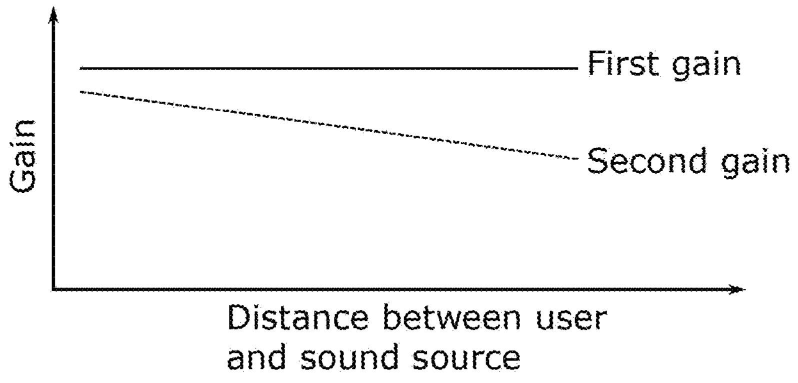
FIG. 8B is a diagram illustrating a gain adjustment according to the embodiment.

Next, operations performed by the above-described acoustic reproduction system 100 will be described with reference to FIG. 6 through FIG. 8B. FIG. 6 is a flowchart illustrating operations performed by the acoustic reproduction system according to the embodiment. In addition, FIG. 7 is a diagram illustrating interpolation points according to the embodiment. FIG. 8A and FIG. 8B each are a diagram illustrating a gain adjustment according to the embodiment.

As illustrated in FIG. 6, when acoustic reproduction system 100 starts operating, obtainer 111 obtains sound information via communication module 102 in the first place. The sound information is decoded by decoding processor 113 into information pertaining to a predetermined sound and information pertaining to a predetermined position.

Sensed-information-input receiver 114 obtains information pertaining to the position of user 99 (S101). Determiner 122 determines a virtual boundary from the obtained position of user 99 (S102). FIG. 7 will be referred to from here. In FIG. 7, lattice points are denoted by white circles or circles with hatching. The position of a sound source object is denoted by a larger circle with dot hatching. A three-dimensional sound field is surrounded by a wall that causes sounds to reverberate, as shown by the outermost double line in the diagram, for example.

For this reason, sounds emitted from the sound source object radially propagate, and some of the sounds directly arrive at the position of user 99 and the rest of the sounds indirectly arrive at the position of user 99 after being reflected off the wall once or more times. In the meantime, the interference between these sounds causes, for example, amplification and attenuation. If calculation processing is to be performed on all such physical phenomena, it would require an enormous amount of calculation processing. However, since propagation characteristics of a sound from a sound source object and lattice points are calculated in advance in this embodiment, it is only essential that transfer characteristics from the lattice points to user 99 be calculated to approximately reproduce propagation of the sound from the sound source object to user 99 with a small amount of processing.

Hereinafter, the operations performed by acoustic reproduction system 100 will be described in plan view, but lattice points may be arranged in a direction perpendicular to the plan view. The virtual boundary is in a circular shape formed about, as its center, a lattice point closest to user 99 and is set to include lattice points on the circumference of the circular shape. In the diagram, the virtual boundary is denoted by a thick line. The virtual boundary in the diagram includes four lattice points (lattice points with hatching).

Let's now go back to FIG. 6. Reader 124 controls storage 123 to read, from a database, calculated propagation characteristics of these lattice points (S103). Next, interpolation-propagation-characteristic calculator 126 determines an interpolation point. As illustrated in FIG. 7, interpolation points (circles with dot hatching) are on the virtual boundary and each of these interpolation points are interposed between two lattice points. For example, a distance between lattice points is determined by a frequency of a predetermined sound included in sound information. Specifically, when the maximum value of a frequency of a sound to be presented by the predetermined sound is, for example, 1 kH, the velocity of the sound in the air is about 340 m/s. When this velocity is converted into a wavelength, it is 340/1000=0.34 m, namely, 34 cm. When a sound is to be physically and accurately presented, lattice points need to be set at intervals of half the wavelength. Accordingly, lattice points need to be set at intervals of 17 cm or less (predetermined intervals≤17 cm) to present the sound of 1 kHz.

If the sound of 1 kHz is to be presented by lattice points set at intervals greater than 17 cm, or in order to present a sound having a frequency higher than 1 kHz by lattice points set at intervals of 17 cm, a lattice point is to be virtually added. The values of above-mentioned 1 kHz and intervals of 17 cm are, as a matter of course, mere examples. In the present embodiment, the information processing device has a processing function of adding virtual lattice points (i.e., interpolation points) as described below to present a sound signal that may include a sound having a frequency higher than 1 kHz, such as the maximum of 2 kHz, 5 kHz, 10 kHz, 15 kHz, and 20 kHz, which is not typically reproduced accurately for set intervals between lattice points, by using lattice points set at intervals of 25 cm (predetermined interval=25 cm), 50 cm (predetermined interval=50 cm), 75 cm (predetermined interval=75 cm), 1 m (predetermined interval=1 m), 2 m (predetermined interval=2 m), and 3 m (predetermined interval=3 m) or "roughly set" intervals greater than foregoing intervals.

Addition of interpolation points as described above can artificially reproduce a state in which lattice points are arranged at closer intervals, using combinations of lattice points and interpolation points. Moreover, in the present embodiment, a way in which an interpolation point is added allows the use of typically-used head-related transfer function database for a transfer function of a sound from the interpolation point to user 99 so as to, not only add a point between points, but also to interpolate the points on a virtual boundary in a circular shape (or a spherical shape) surrounding user 99. In the present embodiment, a propagation characteristic (interpolation propagation characteristic) of a sound from a sound source object to an interpolation point that is taken as a virtual lattice point between two or more lattice points is calculated from propagation characteristics of the sound from the sound source object to the two or more lattice points, to be used for processing sound information. With this, a sound having a frequency higher than a frequency corresponding to a set interval between lattice points can be presented, or an interval between lattice points necessary to present a sound having a certain frequency can be implemented by lattice points arranged at an interval greater than the foregoing interval.

Note that calculation cost, that is an amount of processing, is increased as a value of a predetermined interval decreases, and a frequency of a sound that can be accurately presented by only lattice points is reduced as the value increases. In other words, a predetermined interval is to be appropriately set in accordance with calculation performance of information processing device 101 such that a calculation processing load would not be too high. Alternatively, a predetermined interval may be changeable in accordance with the calculation performance of information processing device 101.

Let's now go back to FIG. 6. In order to implement the above, interpolation-propagation-characteristic calculator 126 calculates an interpolation propagation characteristic of the sound from the sound source to the determined interpolation point from two lattice points on the virtual boundary which sandwiches the interpolation point and a propagation characteristic of the sound from the sound source object to another lattice point that surrounds the interpolation point together with the foregoing two lattice points (S104). Interpolation-propagation-characteristic calculator 126 obtains the already-read propagation characteristics of the sound from the sound source object to the lattice points on the virtual boundary and controls storage 123 to read, from the database, the propagation characteristic of the sound from the sound source object to another necessary lattice point.

Note that a specific example of calculating an interpolation propagation characteristic will be described in detail in an application example presented later in the embodiment.

Next, gain adjuster 127 makes a gain adjustment for the read propagation characteristics of the sound from the sound source object to the lattice points on the virtual boundary (S105). As illustrated in FIG. 8A, in the gain adjustment, gains of respective lattice points and interpolation point on the virtual boundary are adjusted based on the positions of intersections at which a straight line (two-dot-chain line) connecting the position of the sound source object and the position of user 99 and the virtual boundary intersects. Since user 99 is typically never positioned on the virtual boundary, the above-described intersections are present at two locations, one of which is on the side close to the sound source object and the other of which is on the side far from the sound source object (stated differently, opposing the sound source object with user 99 interposed between the intersections). When the intersection on the side close to the sound source object is taken as a first intersection and the intersection on the side far from the sound source object is taken as a second intersection, a lattice point or an interpolation point on the virtual boundary which is closest to the first intersection is the lattice point or the interpolation point closest to the sound source object. A lattice point or an interpolation point on the virtual boundary which is closest to the second intersection is the lattice point or the interpolation point hidden by user 99 when viewed from the sound source object. Typically, the lattice point or the interpolation point closest to the sound source object is where a sound from the sound source object is most readily arrived at, and the lattice point or the interpolation point hidden by user 99 is where the sound from the sound source object is least readily arrived at.

In view of the above, a gain adjustment made to emphasize such phenomena can enhance arrival of a sound from a sound source, namely the sense of sound direction. In particular, when the sense of sound direction is to be presented based on propagation characteristics calculated in advance using lattice points (and interpolation points), clarity of the sense of sound direction is reduced as a distance between the position of the sound source object and user 99 increases. Accordingly, it is effective to place more emphasis on a gain adjustment in accordance with a relative distance between user 99 and the sound source object, as the distance between user 99 and the sound source object increases. Accordingly, a propagation characteristic of the lattice point closest to the first intersection or an interpolation propagation characteristic of the interpolation point closest to the first intersection is to be adjusted to a first gain, and a propagation characteristic of the lattice point closest to the second intersection or an interpolation propagation characteristic of the interpolation point closest to the second intersection is to be adjusted to a second gain, and a relationship of the magnitude of gain between the first gain (solid line) and the second gain (dashed line) is to be adjusted in accordance with the distance between user 99 and the sound source object as shown in FIG. 8B.

In other words, gain adjuster 127 is to set the first gain and the second gain such that the first gain is greater than the second gain and that a difference between the first gain and the second gain is increased as a distance between user 99 and the sound source object increases, and make gain adjustments. Note that the following shows a gain adjustment to be made for a lattice point or an interpolation point between the lattice point or the interpolation point closest to the sound source object and the lattice point or the interpolation point hidden by user 99. For example, a gain adjustment is made such that, on the circumference of the virtual boundary, a gain is reduced to a gain smaller than the first gain as a distance from the lattice point or the interpolation point closest to the sound source object increases and a gain is gradually increased to a gain greater than the second gain as a distance from the lattice point or the interpolation point hidden by user 99 increases.

Let's now go back to FIG. 6. Propagation characteristic processor 121 outputs propagation characteristics and interpolation propagation characteristics for both of which the above-described gain adjustments have been made. Thereafter, calculator 125 calculates transfer functions of the sound from the lattice points and the interpolation points on the virtual boundary to user 99 (S106). Propagation characteristic processor 121 outputs the calculated transfer functions.

Sound information processor 132 uses the output propagation characteristics and interpolation propagation characteristics for both of which gain adjustments have been made and the output transfer functions to generate an output sound signal (S107).

Figure 9A:
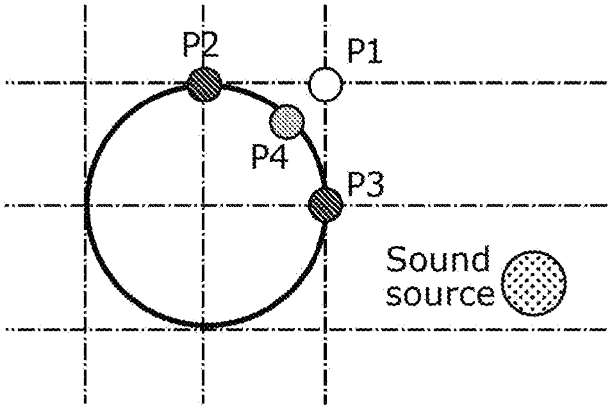
FIG. 9A is a diagram illustrating a configuration of a three-dimensional sound field according to an application example.
Figure 9B:
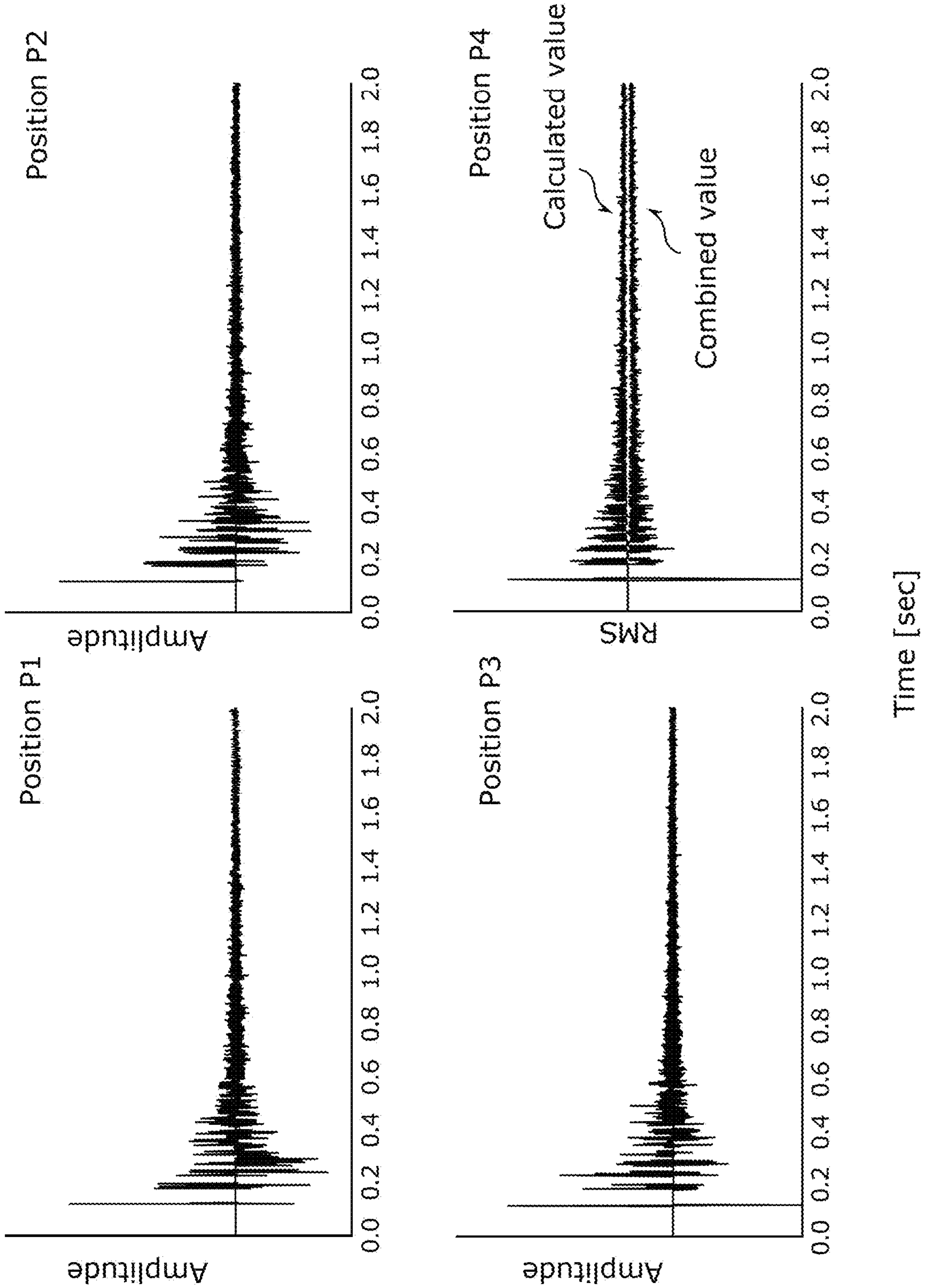
FIG. 9B is a diagram illustrating a comparison between a measured value and a simulated value obtained at an interpolation point according to the application example.

Hereinafter, a specific example of calculating an interpolation propagation characteristic will be described based on an application example with reference to FIG. 9A and FIG. 9B. FIG. 9A is a diagram illustrating a configuration of a three-dimensional sound field according to the application example. FIG. 9B is a diagram illustrating a comparison between a measured value and a simulated value obtained at an interpolation point according to the application example.

In the same manner as FIG. 7, etc., FIG. 9A shows a positional relationship between a sound source, and lattice points and an interpolation point. Microphones were set at position P1, position P2, and position P3 which correspond to the above-mentioned lattice points and at position P4 that corresponds to the above-mentioned interpolation point, and impulse responses (signals) generated when a sound was produced at the position of the sound source object at time point t were measured and obtained. Meanwhile, the following were calculated: (i) the position of the sound source object was estimated from the signals ($S_1(t)$, $S_2(t)$, and $S_3(t)$) generated at position P1, position P2, and position P3, respectively, (ii) distances between the sound source object and respective position P1, position P2, position P3, and position P4 were calculated, and (iii) a time difference ($T_1$) between the signal generated at position P1 and the signal generated at position P4, a time difference ($T_2$) between the signal generated at position P2 and the signal generated at position P4, and a time difference ($T_3$) between the signal generated at position P3 and the signal generated at position P4. Based on the calculated time differences ($T_1$, $T_2$, and $T_3$), the signals ($S_1(t)$, $S_2(t)$, and $S_3(t)$) were caused to shift in time domain such that these signals were taken as if they were generated at position P4. Specifically, signal $S_1(t)$ was caused to be $S_1(t-T_1)$, signal $S_2(t)$ was caused to be $S_2(t-T_2)$, and signal $S_3(t)$ was caused to be $S_3(t-T_3)$.

Using the above, an impulse response (signal) generated when a sound was produced by the sound source object at time point t was calculated based on Equation (1) shown below and was obtained as a simulated value.

$$S_4(t) = a \cdot S_1(t - T_1) + \beta \cdot S_2(t - T_2) + \gamma \cdot S_3(t - T_3) \qquad (1)$$

Note that α, β, and γ in Equation (1) are respectively calculated from Equation (2), Equation (3), and Equation (4) shown below.

[Math. 1]

$$\alpha = \frac{r_1}{\sqrt{r_1^2 + r_2^2 + r_3^2}}. \qquad (2)$$

-continued

[Math. 2]

$$\beta = \frac{r_2}{\sqrt{r_1^2 + r_2^2 + r_3^2}}. \quad (3)$$

[Math. 3]

$$\gamma = \frac{r_3}{\sqrt{r_1^2 + r_2^2 + r_3^2}} \quad (4)$$

Note that r1, r2, and r3 in Equations (2), (3), and (4) respectively denote a distance between position P1 and the sound source object, a distance between position P2 and the sound source object, and a distance between position P3 and the sound source object.

As illustrated in FIG. 9B, the combined value (root-mean-square value) shown in the lower part in the section showing the signal generated at position P4 (shown at the lower right in the diagram) was calculated through combining of signals based on the above Equations (1) through (4) using a calculated value of the signal obtained at position P1 in the simulation (shown at the upper left in the diagram), a calculated value of the signal obtained at position P2 in the simulation (shown at the upper right in the diagram), and a calculated value of the signal obtained at position P3 in the simulation (shown at the lower left in the diagram). The calculated combined value compares favorably with the calculated value of the signal generated at position P4 in the simulation (the root-mean-square value of the transfer characteristic directly calculated from the sound source object) which is shown in the upper part in the section showing the signal generated at position P4, and thus is considered to approximately reproduce the sound at the interpolation point.

OTHER EMBODIMENTS

The embodiment has been described hereinbefore, but the present disclosure is not limited to the above-described embodiment.

For example, the acoustic reproduction system described in the above-described embodiment may be implemented as a single device including all the elements or may be implemented by a plurality of devices to each of which a function is assigned and which operate in conjunction with one another. In the latter case, an information processing device, such as a smartphone, a tablet terminal, and a PC, may be used as a device corresponding to the information processing device. For example, in acoustic reproduction system 100 having a function as a renderer that generates an acoustic signal with added acoustic effects, a server may take on all or part of renderer functions. In other words, the server not illustrated may include all or some of obtainer 111, propagation path processor 121, output sound generator 131, and signal outputter 141. In this case, acoustic reproduction system 100 is implemented by, for example, a combination of an information processing device such as a computer and a smartphone, a sound presentation device such as a head-mount display (HMD) and earphones to be worn by user 99, and the server not illustrated. Note that the computer, the sound presentation device, and the server may be communicably connected via the same network or via different networks. When connected via different networks, the possibility of communication delay increases. Accordingly, the server may be permitted to perform processing only when the computer, the sound presentation device, and the server are communicably connected via the same network. Moreover, whether the server takes on all or some of the renderer functions may be determined depending on an amount of bitstream data that acoustic reproduction system 100 receives.

In addition, the acoustic reproduction system according to the present disclosure may be connected to a reproduction device that includes only a driver, and may be implemented as an information processing device that only reproduces, for the reproduction device, an output sound signal generated based on obtained sound information. In this case, the information processing device may be implemented as a hardware product that includes a dedicated circuit, or may be implemented as a software program for causing a general-purpose processor to perform particular processing.

Moreover, in the above-described embodiment, processing performed by a specific processor may be performed by another processor. The order of a plurality of processes may be changed, and the plurality of processes may be performed in parallel.

In the above-described embodiment, each of the elements may be implemented by executing a software program suitable for the element. Each element may be implemented as a result of a program execution unit, such as a CPU or processor or the like, loading and executing a software program stored in a storage medium such as a hard disk or semiconductor memory.

Each element may also be implemented by a hardware product. For example, each element may be a circuit (or an integrated circuit). These circuits may constitute a single circuit as a whole or may be individual circuits. In addition, these circuits may be general-purpose circuits, or dedicated circuits.

Note that a general or a specific aspect of the present disclosure may be implemented by a device, a method, an integrated circuit, a computer program, or a computer-readable recording medium such as a CD-ROM. A general or a specific aspect of the present disclosure may also be implemented by an optional combination of systems, methods, integrated circuits, computer programs, and recording media.

For example, the present disclosure may be implemented as an audio signal reproduction method executed by a computer, or may be implemented as a program for causing the computer to execute the audio signal reproduction method. The present disclosure may also be implemented as a non-transitory computer-readable recording medium on which such a program is recorded.

The present disclosure also encompasses: embodiments achieved by applying various modifications conceivable to those skilled in the art to each embodiment, or embodiments achieved by optionally combining the elements and the functions of each embodiment without departing from the spirit of the present disclosure.

Note that the encoded sound information according to the present disclosure can be rephrased as a bitstream including (i) a sound signal that is information pertaining to a predetermined sound to be reproduced by acoustic reproduction system 100 and (ii) metadata that is information pertaining to a localization position at which a sound image of the predetermined sound is localized within a three-dimensional sound field. For example, sound information may be obtained by acoustic reproduction system 100 as a bitstream encoded in a predetermined format, such as MPEG-H 3D Audio (ISO/IEC 23008-3). As one example, an encoded sound signal includes information pertaining to a predetermined sound to be reproduced by acoustic reproduction system 100. The predetermined sound here is a sound or a natural environmental sound emitted by a sound source object in a three-dimensional sound field, and may include, for example, a mechanical sound or a sound of an animal including a human. Note that when a plurality of sound source objects are present in a three-dimensional sound field, acoustic reproduction system 100 is to obtain a plurality of sound signals corresponding to respective sound source objects.

Meanwhile, the metadata is information to be used for controlling acoustic processing to be performed on a sound signal in acoustic reproduction system 100, for example. The metadata may be information to be used for describing a scene to be presented in a virtual space (three-dimensional sound field). Here the scene is a term indicating an aggregate of all elements representing three-dimensional videos and acoustic events in the virtual space which are modeled by acoustic reproduction system 100 using the metadata. In other words, the metadata here may contain not only information used to control acoustic processing, but also information used to control video processing. The metadata may certainly contain information used to control either the acoustic processing or the video processing, or may contain information used to control both the acoustic processing and the video processing. In the present disclosure, a bitstream to be obtained by acoustic reproduction system 100 may include the above-described metadata. Alternatively, acoustic reproduction system 100 may obtain metadata alone, separately from a bitstream, as will be described later.

Acoustic reproduction system 100 performs acoustic processing on a sound signal, using metadata included in a bitstream and additionally-obtained interactive positional information, etc. of user 99, to produce a virtual acoustic effect. For example, an acoustic effect, such as early reflection sound generation, late reverberation generation, diffracted sound generation, a distance attenuation effect, localization, sound image localization processing, or the Doppler effect, may be added. Moreover, as metadata, information to switch ON and OFF all or some of the acoustic effects may be added.

Note that all or some of information items contained in metadata may be obtained from sources other than a sound information bitstream. For example, either metadata that controls a sound or metadata that controls a video may be obtained from a source other than the bitstream or both of these metadata items may be obtained from sources other than the bitstream.

When metadata that controls a video is included in a bitstream to be obtained by acoustic reproduction system 100, acoustic reproduction system 100 may include a function of outputting the metadata that can be used to control the video to a display device that displays images or a three-dimensional video reproduction device that reproduces three-dimensional videos.

As one example, encoded metadata contains (i) information pertaining to a three-dimensional sound field that includes a sound source object that emits a sound and an obstruction object and (ii) information pertaining to a predetermined localization position at which a sound image of the sound is localized in the three-dimensional sound field (i.e., to cause the sound to be perceived as a sound arriving from the predetermined direction). The obstruction object here is an object that may affect a sound to be perceived by user 99 by, for example, blocking and reflecting the sound during a time period before the sound emitted by the sound source object arrives at user 99. The obstruction object may include, other than a stationary object, an animal such as a human or a mobile object such as a machine. In addition, when a plurality of sound source objects are present in a three-dimensional sound field, these sound source objects may be obstruction objects for an optional sound source object. Both non-sound-emitting sound source objects, such as building materials and inanimate objects, and sound source objects that emit sounds may also be obstruction objects.

As spatial information contained in metadata, information items indicating, not only the shape of a three-dimensional sound field, but also the shape and position of an obstruction object present in the three-dimensional sound field and the shape and position of a sound source object present in the three-dimensional sound field may be contained. The three-dimensional sound field may be either a closed space or an open space, and metadata contains a reflectance of a structural component, such as a floor, a wall, or a ceiling, which may reflect sounds in the three-dimensional sound field and a reflectance of an obstruction object present in the three-dimensional sound field. The reflectance here is the ratio of reflected sound energy to an incident sound, and is set for each of sound frequency bands. The reflectance may certainly be uniformly set, not depending on sound frequency bands. When the three-dimensional sound field is an open space, a parameter, such as a uniformly set attenuation factor, a diffracted sound, or an early reflection sound, may be used, for example.

In the above description, a reflectance has been used as a parameter pertaining to an obstruction object or to a sound source object which is to be contained in metadata, but the metadata may contain information other than the reflectance. For example, as metadata to be involved with both a sound source object and a non-sound-emitting sound source object, the metadata may contain information pertaining to materials of these objects. Specifically, the metadata may contain a parameter, such as diffusivity, transmittance, or acoustic absorptivity.

As information pertaining to a sound source object, a sound level, an emission characteristic (directionality), a reproduction condition, the number and types of sound sources to be emitted from one object, or information designating a sound source area of an object may be included. The reproduction condition may specify if a sound is a continuous sound or a sound induced by an occurrence of an event. The sound source area of an object may be specified by a relative relationship between the position of user 99 and the position of the object or may be specified using the object as a reference. When the sound source area is specified by a relative relationship between the position of user 99 and the position of the object, user 99 is caused to perceive as if sound X is emitted from the right side of the object and sound Y is emitted from the left side of the object when viewed from user 99, using a surface of the object at which user 99 is viewing as a reference. When the sound source area is specified using the object as a reference, which area of an object emit which sound can be fixed, irrespective of a direction in which user 99 is viewing. For example, when the object is viewed from the front, user 99 is caused to perceive that a high sound is produced from the right side and a low sound is produced from the left side. In this case, when user 99 goes around behind the object, user 99 is caused to perceive that the low sound is produced from the right side and the high sound is produced from the left side when the object is viewed from the back of the object.

As metadata pertaining to a space, the metadata may contain a time period until an early reflection sound is produced, a reverberation time, a ratio between a direct sound and a diffusion sound, etc. When the ratio between a direct sound and a diffusion sound is zero, only the direct sound can be caused to be perceived by user 99.

As metadata, a bitstream may contain, in advance, information indicating the position and the orientation of user 99 in a three-dimensional sound field as initial settings, or need not contain the information. When a bitstream does not contain the information indicating the position and orientation of user 99, information indicating the position and orientation of user 99 is obtained from information other than the bitstream. For example, as for positional information of user 99 in a VR space, the positional information may be obtained from an app that provides a VR content. As for positional information of user 99 to present sounds as augmented reality (AR), the positional information obtained by location estimation performed by a mobile terminal using, a GPS, a camera, or laser imaging detection and ranging (LIDAR) may be used. Note that a sound signal and metadata may be stored in a single bitstream or may be separately stored in a plurality of bitstreams. Likewise, a sound signal and metadata may be stored in a single file or may be separately stored in a plurality of files.

When a sound signal and metadata are separately stored in a plurality of bitstreams, information indicating another associated bitstream may be included in one or some of the bitstreams that store the sound signal and metadata. Moreover, the information indicating another associated bitstream may be included in metadata or control information in each of the plurality of bitstreams that stores a sound signal and metadata. When a sound signal and metadata are separately stored in a plurality of files, information indicating another associated bitstream or another associated file may be included in one or some of the plurality of files that store the sound signal and metadata. Moreover, the information indicating another associated bitstream or another associated file may be included in metadata or control information in each of the plurality of bitstreams that stores a sound signal and metadata.

Here, an associated bitstream or an associated file is, for example, a bitstream or a file that may be simultaneously used during acoustic processing. Information indicating another associated bitstream may be collectively described in metadata or control information stored in one bitstream among a plurality of bitstreams each of which stores a sound signal and metadata or may be separately described in metadata items or control information items stored in two or more bitstreams among the plurality of bitstreams each of which stores a sound signal and metadata. Likewise, information indicating another associated bitstream or another associated file may be collectively described in metadata or control information stored in one file among a plurality of files each of which stores a sound signal and metadata or may be separately described in metadata or control information stored in two or more files among the plurality of files each of which stores a sound signal and metadata. A control file collectively describing information indicating another associated bitstream or another associated file may be generated separately from a plurality of files each of which stores a sound signal and metadata. In this case, the control file need not store a sound signal and meta data.

The information indicating another associated bitstream or another associated file here is an identifier indicating the other bitstream, a file name of the other file, a uniform resource locator (URL), a uniform resource identifier (URI), or the like. In this case, obtainer 120 identifies or obtains a bitstream or a file, based on information indicating another associated bitstream or another associated file. Information indicating another associated bitstream may be contained in metadata items or control information items of at least some of bitstreams among a plurality of bitstreams each of which stores a sound signal and metadata, and information indicating another associated file may be included in metadata items or control information items of at least some files among a plurality of files each of which stores a sound signal and metadata. Here, a file containing information indicating an associated bitstream or an associated file may be a control file such as a manifest file used to distribute a content, for example.

INDUSTRIAL APPLICABILITY

The present disclosure is useful when sounds are reproduced to cause a user to perceive three-dimensional sounds, for example.

The invention claimed is:

1. An information processing method of generating, by processing sound information, an output sound signal for causing a user to perceive a sound as arriving from a sound source within a three-dimensional sound field that is virtual, the information processing method being executed by a computer, the information processing method comprising:

obtaining a position of the user within the three-dimensional sound field;

determining a virtual boundary that includes two or more lattice points surrounding the user, based on the position of the user which has been obtained, the two or more lattice points being among a plurality of lattice points set at predetermined intervals within the three-dimensional sound field;

reading, from a database that stores propagation characteristics of the sound from the sound source to the plurality of lattice points, the propagation characteristics of the sound from the sound source to the two or more lattice points included in the virtual boundary determined;

calculating transfer functions of the sound from the two or more lattice points included in the virtual boundary determined to the position of the user; and generating the output sound signal by processing the sound information using the propagation characteristics read and the transfer functions calculated.

2. The information processing method according to claim 1, wherein the information processing method further comprises:

determining an interpolation point that is on the virtual boundary and is between the two or more lattice points; and calculating an interpolation propagation characteristic of the sound from the sound source to the interpolation point determined, based on the propagation characteristics read, the calculating of the transfer functions includes calculating the transfer functions of the sound from the two or more lattice points to the position of the user and a transfer function of the sound from the interpolation point determined to the position of the user, the two or more lattice points and the interpolation point determined being included in the virtual boundary, and the generating of the output sound signal includes generating the output sound signal by processing the sound information using the propagation characteristics read, the interpolation propagation characteristic calculated, and the transfer functions calculated.

3. The information processing method according to claim 1, further comprising:

making a gain adjustment for the propagation characteristics read, wherein the gain adjustment includes:

adjusting, to a first gain, a propagation characteristic of a lattice point that is closest to a first intersection closer to the sound source than a second intersection is, the propagation characteristic being among the propagation characteristics read, the first intersection being among intersections at which the virtual boundary and a straight line connecting the sound source and the position of the user intersect;

adjusting, to a second gain, a propagation characteristic of a lattice point that is closest to the second intersection opposing the first intersection with the user interposed between the first intersection and the second intersection, the propagation characteristic being among the propagation characteristics read; and adjusting to cause (i) the first gain to be greater than the second gain and (ii) a difference between the first gain and the second gain to increase as a distance between the user and the sound source increases, and in the generating of the output sound signal, the propagation characteristics for which the gain adjustment has been made are used.

4. The information processing method according to claim 1, further comprising:

determining an interpolation point that is on the virtual boundary and is between the two or more lattice points;

calculating an interpolation propagation characteristic of the sound from the sound source to the interpolation point determined, based on the propagation characteristics read; and making a gain adjustment for the propagation characteristics read and the interpolation propagation characteristic calculated, wherein the calculating of the transfer functions includes calculating the transfer functions of the sound from the two or more lattice points to the position of the user and a transfer function of the interpolation point determined to the position of the user, the two or more lattice points and the interpolation point determined being included in the virtual boundary, the generating of the output sound signal includes generating the output sound signal by processing the sound information using the propagation characteristics to which the gain adjustment has been made, the interpolation propagation characteristic to which the gain adjustment has been made, and the transfer functions calculated, the making of the gain adjustment includes (i) adjusting, to a first gain, a propagation characteristic of a lattice point closest to a first intersection or the interpolation propagation characteristic of an interpolation point closest to the first intersection, the propagation characteristic being among the propagation characteristics read, the first intersection being closer to the sound source than a second intersection is and being among intersections at which the virtual boundary and a straight line connecting the sound source and the position of the user intersect and (ii) adjusting, to a second gain, a propagation characteristic of a lattice point closest to the second intersection or the interpolation propagation characteristic of an interpolation point closest to the second intersection, the second intersection opposing the first intersection with the user interposed between the first intersection and the second intersection, and the first gain is greater than the second gain and a difference between the first gain and the second gain increases as a distance between the user and the sound source increases.

5. The information processing method according to claim 1, wherein the virtual boundary is a circle or a sphere that passes through all of the two or more lattice points.

6. A non-transitory computer-readable recording medium for use in a computer, the recording medium having recorded thereon a computer program for causing the computer to execute the information processing method according to claim 1.

7. An information processing device that generates, by processing sound information, an output sound signal for causing a user to perceive a sound as arriving from a sound source within a three-dimensional sound field that is virtual, the information processing device comprising:

an obtainer that obtains a position of the user within the three-dimensional sound field;

a determiner that determines a virtual boundary that includes two or more lattice points surrounding the user, based on the position of the user which has been obtained, the two or more lattice points being among a plurality of lattice points set at predetermined intervals within the three-dimensional sound field;

a reader that reads, from a database that stores propagation characteristics of the sound from the sound source to the plurality of lattice points, the propagation characteristics of the sound from the sound source to the two or more lattice points included in the virtual boundary determined;

a calculator that calculates transfer functions of the sound from the two or more lattice points included in the virtual boundary determined to the position of the user; and a generator that generates the output sound signal by processing the sound information using the propagation characteristics read and the transfer functions calculated.

8. An acoustic reproduction system comprising:

the information processing device according to claim 7; and a driver that reproduces the output sound signal generated.

* * * * *